June 8, 1954
R. DUPONT
2,680,265
AIR BAG
Filed Dec. 5, 1950
3 Sheets-Sheet 1
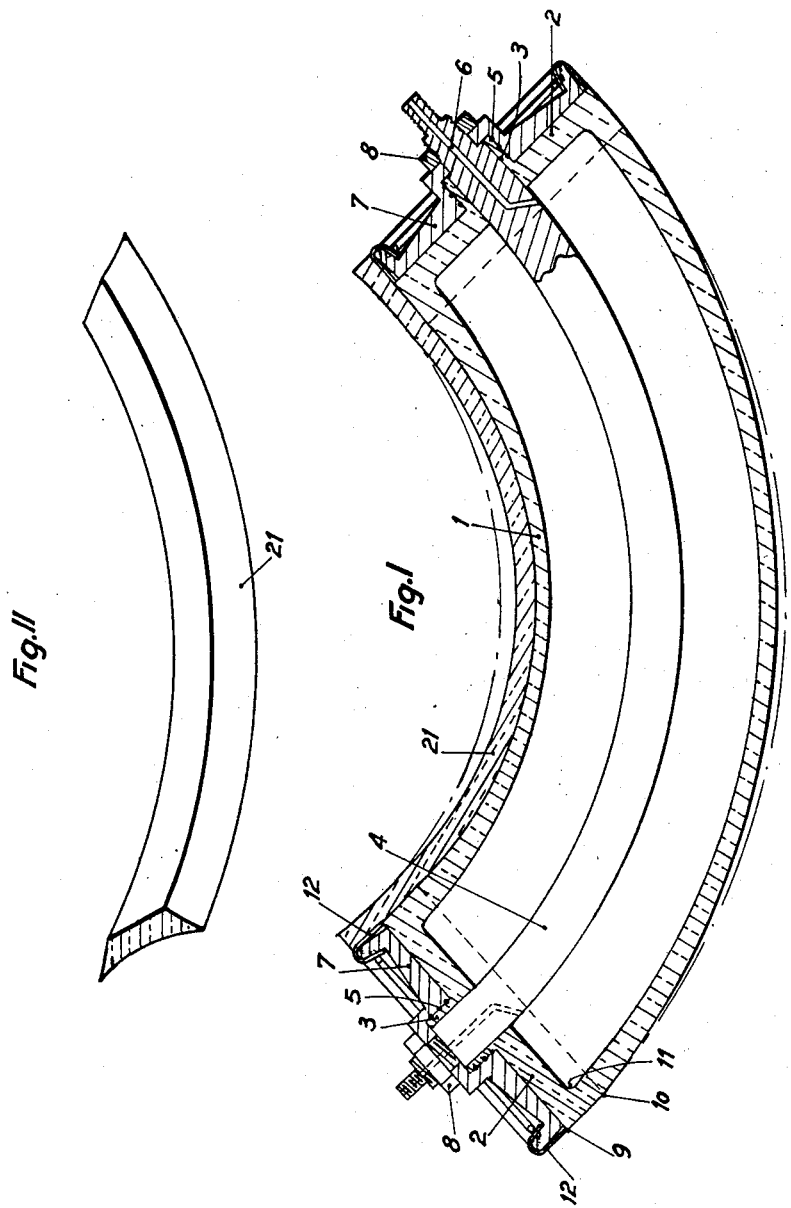
INVENTOR
ROLAND DUPONT
By Linton and Linton
ATTORNEYS

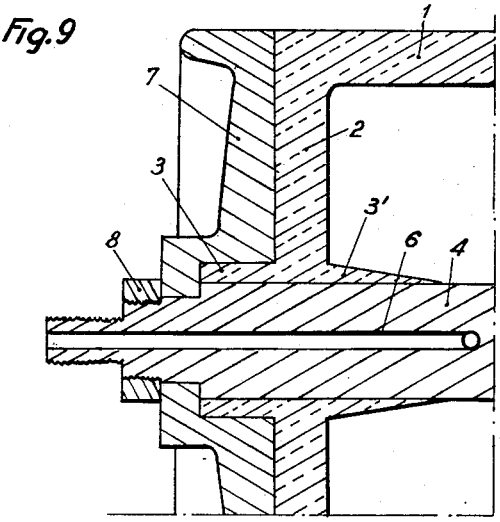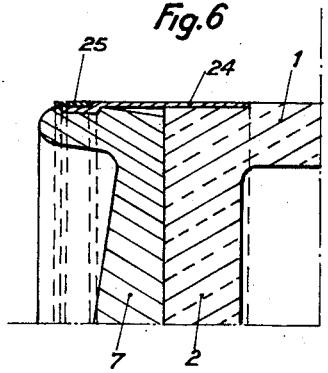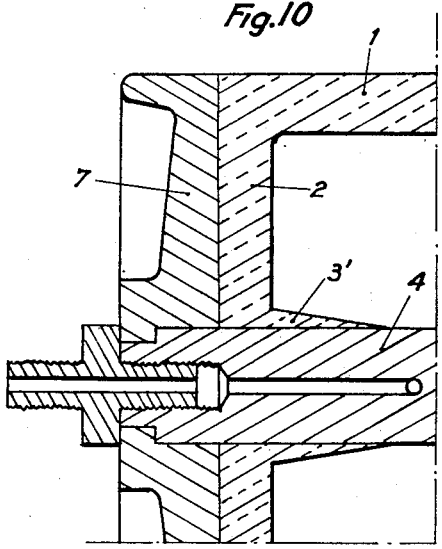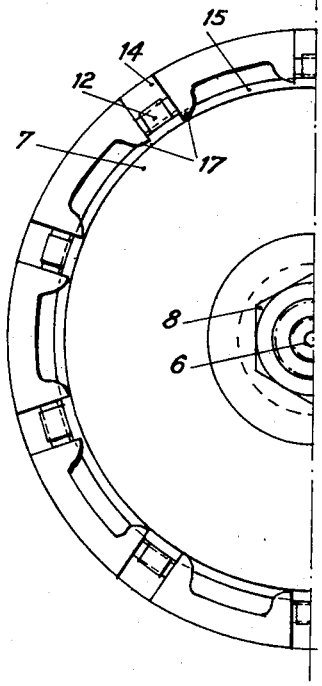

June 8, 1954   R. DUPONT   2,680,265
AIR BAG
Filed Dec. 5, 1950   3 Sheets-Sheet 3
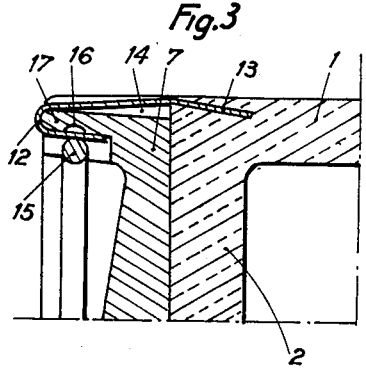
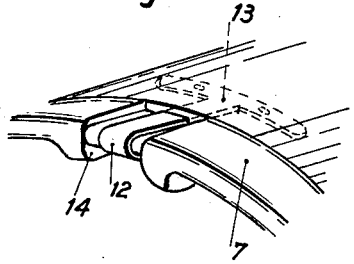
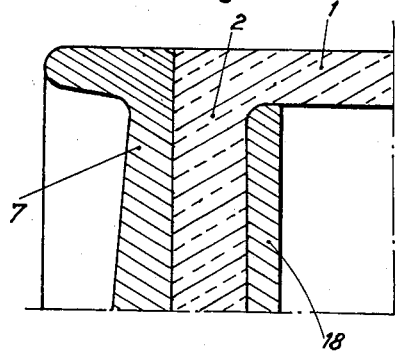
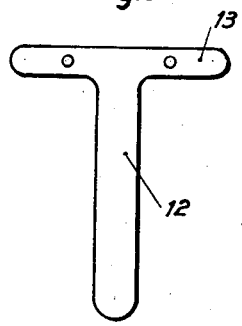
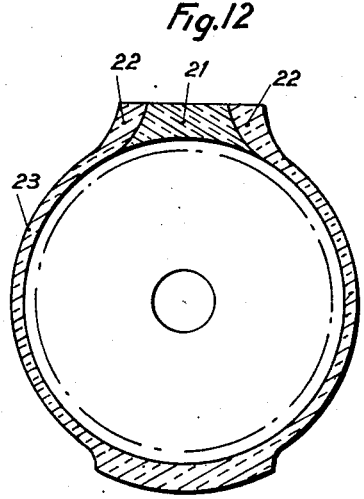
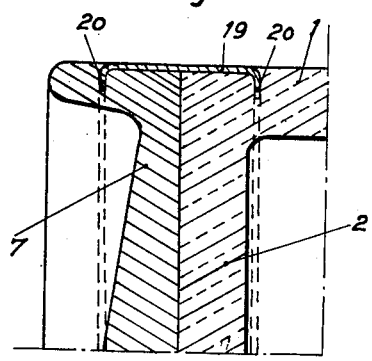
INVENTOR
ROLAND DUPONT
By Linton and Linton
ATTORNEYS Patented June 8, 1954

2,680,265

UNITED STATES PATENT OFFICE 2,680,265

AIR BAG

Roland Dupont, Epernay, France

Application December 5, 1950, Serial No. 199,251

Claims priority, application France
December 6, 1949

6 Claims. (Cl. 18—45)

For repairing a pneumatic tire for motor car or motor cycle, use is made of elastic air bags that are generally put inside the tire and are inflated for use so that the outer walls of the tire press hard against the walls of the heating mould in which this tire has been inserted.

The air bags as used ordinarily are made of several thicknesses of canvas and vulcanised rubber. The drawback about them is that they are very expensive, they sometimes have only a very short lease of life and are never really satisfactory since they cannot stretch far enough in a transverse direction.

Various other types have been suggested, formed by a body of flexible airtight and expansible material, its extension lengthwise being restricted by two metal domes or caps, connected together by a metallic spacing piece, but such devices have never proved satisfactory in practice.

My invention is an improvement on the hollow elastic air bags of which the extension lengthwise is restricted by two metallic end-members connected together by a rigid spacer piece, and its object is to provide a completely satisfactory type of air bag.

The elastic air bag of circular cross section of which use is made in the invention forms a pneumatic bag that is curved lengthwise in the form of a circular arc similar to that of the tire to be repaired and that is finished off at its end by transverse walls.

The following are the main characteristics of my invention:

1. Each of the two transverse walls of the end of the air bag is extended outwards by a cylindrical or cylindro-conical tubular part that is fastened by binding or any form of tightening on the end of the spacing piece carrying the metallic end-members and these prevent the air bag from expanding sideways. In this way, as air tightness is effected on a member of very small diameter, it may be ensured very easily and the pressure strains exerted peripherally by the tire on the end transverse walls of the air bag cannot disturb adversely the airtightness of the latter.

2. Each of the two transverse walls of the penumatic bag may be extended likewise towards the inside of the bag by cylindro-conical tubular parts that are enough in themselves to ensure sufficient airtightness in practice without any binding or tightening means owing to the fact that the total pressure causing the cones to bear strongly against the spacer piece is greater than the pressure that might be apt to get away by going between the spacer and the cylindrical portion of the cylindro-conical tubular parts.

Use may be made on the transverse walls of the tubular parts of the pneumatic bag both outer and inner, together or separately without being prejudicial to the invention.

3. The diameter of the air bag is, between its ends, less than the inner diameter of the tire to be repaired, but it is substantially equal at its ends, and this over an area of small length. The diameter than gradually gets less up to the middle of the air bag. As the air bag, between its ends, is of less size in diameter than the tire to be repaired, it is possible to put inside the tire outer-cover patches that are sometimes thick without running the danger of any harmful puckering of the air bag but as the air bag at its ends is appreciably of the same diameter as the tire, the inner wall of the latter presses against the end walls of the air bag when closing up the mould of which use is made for the repairing to be done; the air bag therefore has not to be expanded crosswise at its ends, which saves the latter from any bursts or tearing as noted up to now with air bags of standard pattern.

4. The transverse walls of the air bag are supported against the metallic end-members by suitable means as disclosed in what follows. This arrangement helps to avoid any bursts that might take place in the peripheral areas and this is so because at the time of the inflation of the air bag the end walls of the latter remain necessarily held and pressed against the inner walls of the metallic studs.

5. The thickness of the side wall of the air bag gets less and preferably gradually, from a point close to each of its ends up to the middle. This arrangement enables the air bag to be blown up gradually and steadily.

6. Lastly the air bag is ended off by a flexible band lengthwise that is covered with canvas or otherwise that is intended to go between the beadings of the tire to be repaired and of which the cross sectional area is designed so as to appreciably fill the spacing between the two beadings of the tire. The aim of this flexible band therefore is to restrict the spreading of the air bag between the beadings of the tire, while enabling repair work to the beadings of the tires to be carried out in a thorough manner.

A more detailed description will now be given of my invention taken with reference to the attached drawings in which:

Figure 1 is a longitudinal section of an air bag, according to the invention, the wall of the tire when undergoing repair being shown in dotted line;

Figure 2 is an end view of the half of one end of the air bag;

Figures 3, 4, 5 and 6 are sectional details showing various methods of connection of a transverse wall with the accompanying stud;

Figure 7 is a perspective view of one of the linking members;

Figure 8 is a plan view of a linking member;

Figures 9 and 10 show in section the means for making the air bag easily and completely airtight;

Figure 11 is a perspective view of the flexible longitudinal band connected to the air bag; and Figure 12 is a cross section showing the air bag and its flexible accompanying band in its working position inside a tire that has to be repaired.

The pneumatic air bag, formed as described and made up of flexible and expansible material such as natural or synthetic rubber, consists of a side wall 1 and two end transverse walls 2 each provided at its centre with a tubular extension 3 that is intended to be bound in a watertight way around the end of the inner rigid spacing piece 4, for instance by a binding 5 or by any other means. The transverse walls 2 may extend towards the inside by a tubular extension cylindroconical for preference 3' (Figures 9 and 10). The inner tubular extensions 3' are enough on their own in practice to ensure, without the help of any binding, the watertightness through the fact that the greater the pressure inside the bag, the tighter it is forced against the spacer piece and there is less chance for the fluid to get away by going between the spacer and the studs 3'.

The tubular extensions 3 and 3' may be used together (Figure 9) or separately (Figure 10), or only the inner extension 3' is employed. Each of the ends of the suitably curved spacer 4 has a channel 6 made through it to enable the inlet or outlet of the fluid or liquid used for inflation and carries a stiff metal end-member 7, fastened for instance between a shoulder of the spacer and a nut 8 that is screwed on the threaded end of the latter.

The transverse walls 2 have a diameter that is practically equal to the inner theoretical diameter of the tire to be repaired and are of the same diameter as the stiff end-member pieces 7. The diameter of the air bag at its ends therefore has not to expand under the effect of pressure. It will be observed that the outside diameter of the air bag remains the same in a space included between points 9 and 10 with a view to avoiding any strain in the area of the internal angle 11 made by a transverse wall 2 and the side wall 1 of the air bag. Suitable means are provided for making the transverse walls 2 of the air bag rigid with the stiff end-members 7, when beginning to inflate the air bag and for avoiding the point of weakness that might occur from a vacuum between an end-member 7 and the corresponding wall 2. Provision may be made, for instance, at points near the periphery, of methods of tying, that are flexible in transverse direction and rigid in the longitudinal direction.

These flexible tying methods may be formed by T-shaped pieces 12 (Figure 8), of thin metal sheet, of which the arm 13 is embedded in the walls of the air bag when it is being made. The wings that protrude have been put in recesses 14 cut all around the metallic end-members and evenly spaced. The end of the arms of the T-pieces is bent over and, in order to hold the arms referred to, a metallic and elastic "keeper" 15 is housed in a slot 16 that is cut in the lower portion of the lugs 17 of the end-member 7.

Other means may be used for holding the ends of the bag against the metallic end-members, for instance those pointed out in Figures 4, 5 and 6. Figure 4 shows the addition of an inner support plate 18 fastened on the spacer 4. Figure 5 shows the use of an outer collar 19 with edges 20 that go into the wall 2 and end-member 7. Figure 6 shows the use of a circular band 24, made of canvas, for instance, that is partly vulcanised on the external peripheries of the air bag and of which the other portion is fastened by binding 25, or other means on the periphery of the rigid end-members 7. It will be remembered that the invention is characterised by the principle of this means of linking rather than by the special means used.

Finally, to place a restriction on the stretching of the air bag between the beadings of the tire, the air bag will be covered up over all its length with a flexible band 21 of rubber or similar material, preferably made with canvas on the outside (to make a stronger job without losing any of its flexibility); this fabric-covered band will have, in its cross section, the shape of the empty space that it is intended to fill between the beadings 22 of the tire to be repaired 23.

I claim:

1. A sectional repair bag for pneumatic tires comprising an inflatable bag of annular cross-section having a pair of flat end walls each closing an end of said bag the external diameter of which is larger at the ends thereof than in its medial portion with its longitudinal wall being progressively reduced in thickness from the ends thereof towards said medial portion, each of said walls having a tubular open extension extending through and substantially perpendicular from a central portion of its respective wall, a substantially rigid member extending longitudinally of said bag and through said tubular extensions and having a fluid bore formed in each end for the entrance of fluid to said bag, a pair of rigid annular abutment plates of substantially the same diameter as said end walls and each plate having a flat interior face positioned against one of said bag end walls, each of said plates having a central opening formed therethrough through which extends an end portion of said rigid member and a recess formed in said flat face thereof around said opening for receiving one of said tubular extensions therein, means for fixedly retaining the periphery of each end wall to the exterior of its adjacent abutment plate for preventing said wall from separating from its respective plate, but allowing a small expansion of said wall in a transverse direction, and means for retaining said rigid member and said plates together.

2. A sectional repair bag for pneumatic tires as set forth in claim 1 wherein said wall retaining means consists of a pair of rings having a U-shaped cross section with each ring mounted on the periphery of one of said end walls and its adjacent plate with the side walls of the ring embedded in said wall and plate for retaining the same together.

3. A sectional repair bag for pneumatic tires as set forth in claim 1 wherein said wall retaining means consists of a pair of flexible bands each mounted on the periphery of one of said end walls and its adjacent plate and having a part thereof vulcanized to said bag and means for fastening an opposite part of each band to its plate.

4. A sectional repair bag for pneumatic tires as set forth in claim 1 wherein said wall retaining means consists of a pair of flat annular plates of substantially the same diameter as the interior of said bag and mounted on said rigid member substantially perpendicular thereto and each plate positioned against one of said end walls.

5. A sectional repair bag for pneumatic tires as set forth in claim 1 wherein each of said tubular extensions has a conical portion extending within said bag and closely positioned around said rigid member.

6. A sectional repair bag for pneumatic tires comprising an inflatable bag of annular cross-section having a pair of flat end walls each closing an end of said bag, each of said walls having a tubular open extension extending through and substantially perpendicular from a central portion of its respective wall, a substantially rigid member extending longitudinally of said bag and through said tubular extensions and having a fluid bore formed in each end for the entrance of fluid to said bag, a pair of rigid annular abutment plates of substantially the same diameter as said end walls and each plate having a flat face positioned against one of said bag end walls, each of said plates having a central opening formed therethrough through which extends an end portion of said rigid member and a recess formed in said flat face thereof around said opening for receiving one of said tubular extensions therein, a plurality of T-shaped members having the head ends thereof embedded in said end wall, said plates each having a plurality of lateral recesses formed in the peripheral wall thereof around each of which extends the shank of one of said T-shaped members, means for retaining all of the shank ends within their recesses and means for retaining said rigid member and said plates together.

References Cited in the file of this patent

UNITED STATES PATENTS

| Number | Name | Date |
|---|---|---|
| 1,140,527 | Powell | May 25, 1915 |
| 1,705,083 | Burke | Mar. 12, 1929 |
| 1,737,110 | Desautels | Nov. 26, 1929 |
| 1,760,897 | Desautels | June 3, 1930 |
| 1,818,766 | Smith et al. | Aug. 11, 1931 |
| 1,963,871 | Semler | June 19, 1934 |